(12) United States Patent
Mattern et al.

(10) Patent No.: US 7,921,062 B2
(45) Date of Patent: Apr. 5, 2011

(54) DYNAMIC ALLOCATION OF POSTAL SECURITY DEVICES

(75) Inventors: James Mattern, Reno, NV (US); Lodovico Minnocci, Durham, CT (US)

(73) Assignee: Neopost Technologies SA, Bagneux (FR)

( * ) Notice: Subject to any disclaimer, the term of this patent is extended or adjusted under 35 U.S.C. 154(b) by 524 days.

(21) Appl. No.: 11/488,379

(22) Filed: Jul. 17, 2006

(65) Prior Publication Data

US 2006/0294030 A1    Dec. 28, 2006

Related U.S. Application Data

(63) Continuation-in-part of application No. 10/766,975, filed on Jan. 29, 2004, now abandoned.

(60) Provisional application No. 60/763,499, filed on Jan. 31, 2006, provisional application No. 60/763,554, filed on Jan. 31, 2006.

(51) Int. Cl.
*G06F 17/00* (2006.01)
*G06Q 20/00* (2006.01)
*G05B 19/418* (2006.01)

(52) U.S. Cl. ............................... 705/401; 705/8; 705/60

(58) Field of Classification Search ................. 705/8, 60, 705/401
See application file for complete search history.

(56) References Cited

U.S. PATENT DOCUMENTS

| | | | |
|---|---|---|---|
| 4,787,045 A | 11/1988 | Storace et al. | |
| 5,710,706 A | 1/1998 | Markl et al. | |
| 5,826,239 A * | 10/1998 | Du et al. | 705/8 |
| 6,098,058 A * | 8/2000 | Gravell et al. | 705/410 |
| 6,865,558 B1 * | 3/2005 | Pierce et al. | 705/60 |
| 2001/0042052 A1 | 11/2001 | Leon | |
| 2001/0047278 A1 | 11/2001 | Brookner et al. | |
| 2002/0083020 A1 | 6/2002 | Leon | |
| 2002/0178354 A1 | 11/2002 | Ogg et al. | |
| 2002/0194377 A1 * | 12/2002 | Doolittle et al. | 709/246 |
| 2003/0074324 A1 | 4/2003 | Kresina et al. | |
| 2003/0187666 A1 | 10/2003 | Leon | |
| 2004/0143762 A1 * | 7/2004 | Audebert et al. | 713/201 |
| 2005/0075990 A1 | 4/2005 | Ogg | |
| 2006/0015468 A1 | 1/2006 | Mattern | |
| 2007/0078794 A1 * | 4/2007 | Schnapp et al. | 705/401 |

FOREIGN PATENT DOCUMENTS

| | | |
|---|---|---|
| EP | 0 665 517 A2 | 8/1995 |
| EP | 0 854 449 A2 | 7/1998 |
| EP | 0927959 A3 | 9/2000 |
| EP | 0927966 A3 | 9/2000 |
| EP | 1022689 A3 | 11/2000 |
| EP | 1420369 A3 | 5/2004 |
| WO | WO01/035346 | 5/2001 |
| WO | WO01/078018 | 10/2001 |

OTHER PUBLICATIONS

"Pitney Bowes finds niche in express mail market," Connecticut Business, Mar. 16, 1986, p. 111, lines 10-16.
The Search Report and Written Opinion corresponding to the PCT/US07/72735 application dated Jan. 29, 2009.

* cited by examiner

*Primary Examiner* — Fadey S Jabr
(74) *Attorney, Agent, or Firm* — Morris & Kamlay LLP

(57) ABSTRACT

A system for dynamically allocating one or more postal security devices (PSDs), includes an indicia pool utilizing PSDs for generating indicia, a download pool for refreshing PSD funds, and a means for allocating the one or more PSDs among the indicia pool and download pool according to indicia generating requirements and funding amounts within the one or more PSDs.

23 Claims, 11 Drawing Sheets

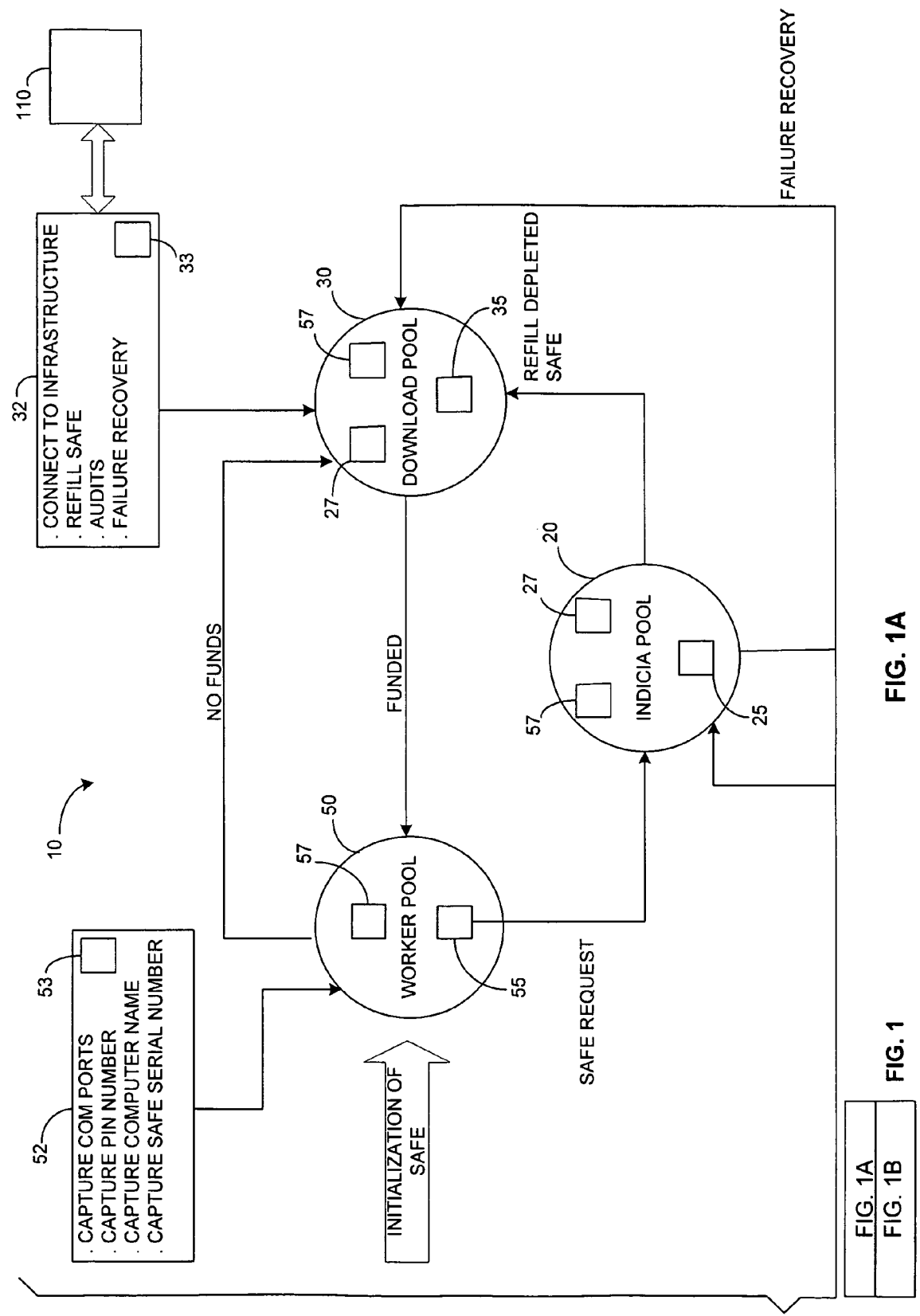

DYNAMIC ALLOCATION OF POSTAL SECURITY DEVICES

CROSS REFERENCES TO RELATED APPLICATIONS

This application is a continuation-in-part of U.S. Nonprovisional application Ser. No. 10/766,975, filed Jan. 29, 2004, now abandoned which is hereby incorporated by reference in its entirety. This application claims priority to U.S. Provisional Application No. 60/763,499, filed Jan. 31, 2006 and claims priority to U.S. Provisional Application No. 60/763,554, filed Jan. 31, 2006, both of which are hereby incorporated by reference in their entirety.

BACKGROUND

The disclosed embodiments relate to franking operations and, more particularly, to a franking system that utilizes a number or more postal security devices (PSDs).

It would be advantageous to provide a system that allocates one or more PSDs to different functions according to indicia generating requirements and funding amounts within the one or more PSDs.

More and more services may be offered to franking machine customers. Authorizing the use of these services and billing these services may become difficult. It would be advantageous to find a solution to bill a user easily and reliably using a device, for example, a franking machine or inserter. Such a solution should open new options for business models.

SUMMARY OF THE INVENTION

The present invention is directed to a system that generally provides a mechanism where multiple PSDs may produce indicia at a high rate, and a robust software architecture that provides for refreshing of PSD funds when required and for diagnostic and corrective action in the event of PSD hardware and software failure. The disclosed embodiments are directed to a system for dynamically allocating one or more postal security devices (PSDs) to various groups, or pools, including an indicia pool utilizing PSDs for generating indicia, and a download pool for refreshing PSD funds. An allocation application is provided for allocating the one or more PSDs among the pools according to indicia generating requirements and funding amounts within the one or more PSDs. In addition, a multi threaded calling application is provided to maximize the output of the indicia pool.

The PSD's may be distributed, that is, they may be located geographically apart from each other. The disclosed system made up of allocated PSD's may be referred to as a meter farm.

A user may be equipped with a device that connects to and takes advantages of the meter farm. The customer device may also have the functions of a standard postal meter. The customer device may utilize technologies similar to those used in present postal funding systems.

Instead of funding currency, the funding could represent "service units". "Service units" could be cycles, ink cartridges, money, connection time, connection number, etc.

A user may periodically re-fill the customer device with "Service units" and may be billed according to a contract, for example, pre-pay, post-payment, credit line, etc.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EMBODIMENT(S)

Figure 1B:
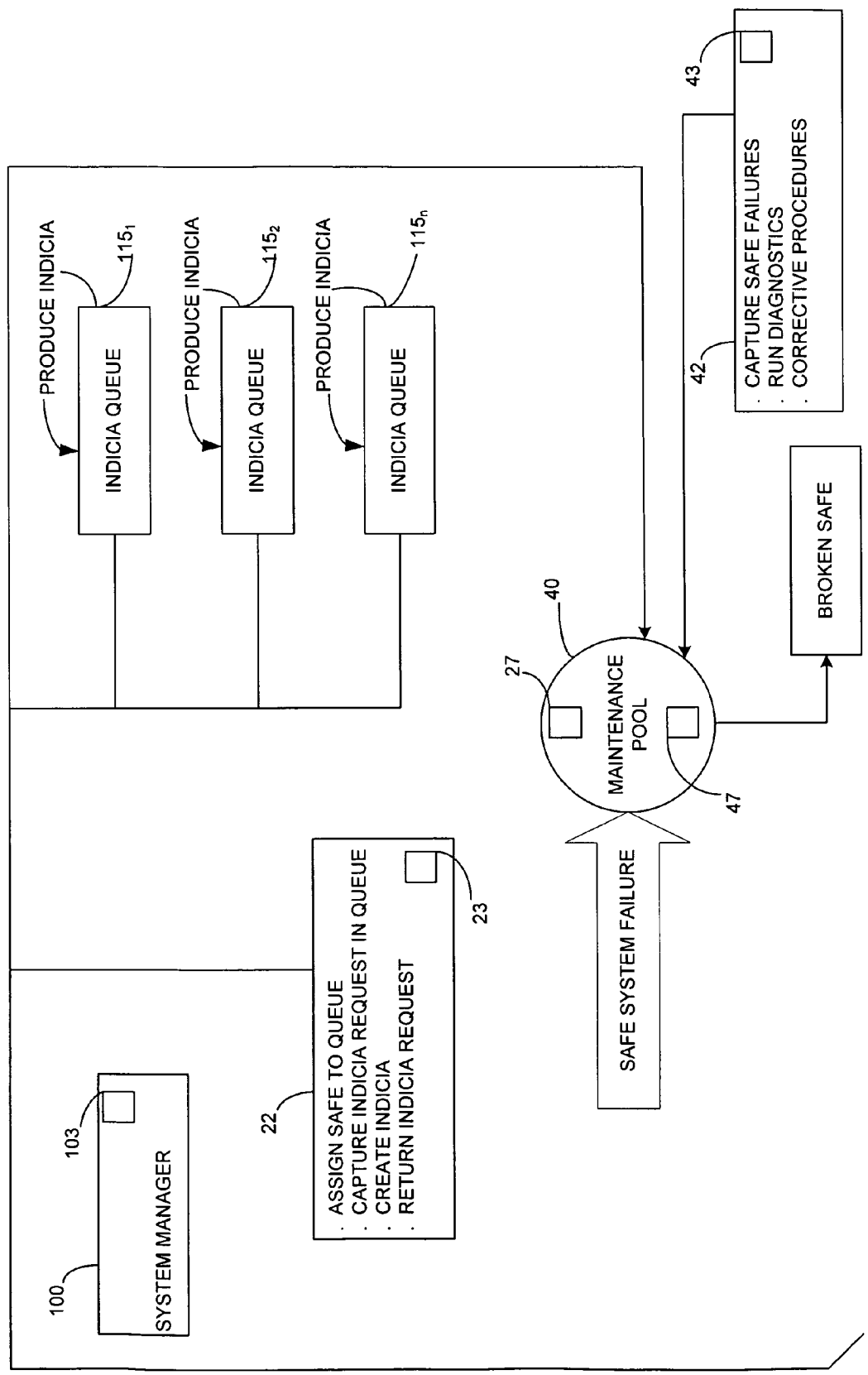
FIG. 1 shows a system according to the disclosed embodiments.

Referring to FIG. 1, a system 10 incorporating features of the disclosed embodiments is illustrated. Although the embodiments disclosed will be described with reference to the embodiments shown in the drawings, it should be understood that the embodiments disclosed can be embodied in many alternate forms of embodiments. For example, the disclosed embodiments may be implemented in hardware, software, or any combination of hardware and software. In addition, any suitable size, shape or type of elements or materials could be used. For the embodiments disclosed herein, a PSD may also be referred to as a SAFE.

As shown in FIG. 1, the system 10 generally comprises groups of PSDs referred to as pools, and programs to operate the pools.

The present invention is directed to a system that dynamically allocates PSDs among the pools according to system requirements, functions, and the condition or operating state of the PSDs.

PSD pools may be designated Indicia Pool 20, Download Pool 30, Maintenance Pool 40 and Worker Pool 50. Other designations may also be used.

The Worker pool 50 may perform PSD initialization and information acquisition. The Worker pool 50 may include a single queue and may function generally as an initialization and holding area for PSDs. As part of the initialization process, the Worker Pool 50 may acquire a PSD ID, set a Port Number, Computer Name, and PIN for a specific PSD 55. The PSD 55 may be allocated to any pool from the Worker's Pool 50 and the PSD 55 can be placed back into this pool from any pool.

The Indicia pool 20 utilizes one or more PSDs 25 to create indicia. The Indicia pool 20 generally acquires PSDs from the Worker pool 50. When a PSD becomes low on funds, it may be allocated to the Download pool. The Indicia pool 20 may have multiple queues, however, the number of queues may be limited by the number of available PSDs.

If the number of Indicia queues equals the number of working PSDs, then the system may close down the Indicia queue that has no operational PSD and redistribute the indicia requests to the other Indicia queues.

The Download pool 30 provides fund replenishment for the PSD's. PSD's 35 may be allocated to the Download pool 30 from the Worker pool 50. The Download pool 30 sends a replenished PSD back to the Worker pool 50. The Download pool 30 may have a single queue that has configurable options for automated downloads.

PSDs may be allocated to the Maintenance pool 40 when they cannot perform one or more functions, are non-responsive, or are generally not working. The Maintenance pool 40 may include a single queue.

The designation "not working" may indicate a conditional problem. As an example, a particular PSD 27 may not be printing Indicia in the Indicia pool 20. The nonprinting PSD 27 may be allocated to the Maintenance pool 40 where diagnostics may be performed. Based on the diagnostic results, corrective action may also be performed. As a further example, the Maintenance pool 40 may perform diagnostics that determine that the PSDs watchdog timer has elapsed. The Maintenance pool 40 may then allocate the PSD 27 to the Download pool 30 for a zero fund reset. Other corrective actions may include application or operating system downloads, PSD resets. etc. For those PSDs implemented using hardware, the Maintenance pool 40 may also determine that the PSD must be physically repaired or returned to the manufacturer.

In an exemplary operation of system 10, a PSD 57 may be first initialized into the Worker pool 50, and from there sent into the Download pool 30 to receive funds. After the funds have been received, the PSD 57 may be removed from the Download pool 30 and sent back to the Worker pool 50. Now funded, if a need arises the PSD may be removed from the Worker pool 50 and placed into the Indicia pool 20 where it may generate indicia until it runs out of funds.

The Indicia pool 20, realizing that the PSD 57 is out of funds may place the spent PSD 57 into the Download pool 30 and extract a replacement from the Worker pool 50 if a PSD is available. If a PSD is not available, the Indicia pool 20 may wait until the Download pool 30 places the PSD back into the Worker pool 50.

Typical system applications may include: A kiosk where a single PSD is installed for postage dispensing; A high-speed/dedicated printer, where multiple PSDs create indicia at the rate of approximately 18,000-36,000 an hour (maximum limit has not yet been determined); An internet/intranet platform where high volumes of indicia may be created by multiple users; Page Printing such as Word; and Dispersions of PSDs to multiple computers controlled by a single location.

One embodiment of the present invention may operate as follows: upon system initialization, all PSDs may generally be allocated to the Worker pool 50. A worker routine, or program, referred to as a worker manager 52 may interrogate the PSDs and capture each PSDs comports, PIN number, computer name, and serial number. The worker manager 52 may also capture additional information. The worker manager 52 may report all captured information and the status of each PSD to a system management routine or program, referred to as a system manager 100.

The system manager 100 manages the overall operation of the system 10. If a PSD is determined to have no funds, this information is reported to the system manager which allocates the PSD to the Download pool 30. If a PSD is deemed to be non responsive or otherwise defective, the system manager 100 may allocate it to the Maintenance pool 40.

Upon being allocated to the Download pool 30, a download routine, or program, referred to as a download manager 32 may initiate a funds replenishment routine. The download manager 32 may initiate an unattended download where a funds provider 110 is contacted, funds are requested, and are either provided or the request is denied. One example of a funds provider 110 may be the Mailroom Technologies TMS system. The PSD itself may also be capable of initiating an unattended funds download. When a PSD is funded, the system manager 100 may allocate it to the Worker pool 50. The download manager reports the status of each PSD in the Download pool 30 to the system manager 100. If a PSD is deemed to be non responsive or otherwise defective, it may be allocated to the Maintenance pool 40.

When indicia is required, an indicia manager 22 initiates Indicia queues 115, . . . 115, as required and initiates a request to the system manager 100 for PSDs to service the queues. In response, the system manager 100 may allocate available PSDs from the Worker pool 50 to the indicia pool. The indicia manager 22 keeps track of the capacity of each PSD in the indicia pool 20 and generates requests to add or delete PSDs as required to service the Indicia queues 115, . . . 115$_n$. The indicia manager 22 is also capable of reporting the status of each PSD in the indica pool 20 to the system manager 100. The indicia manager 22 may also identify problematic PSDs to the system manager 100 which in turn may allocate them to the Maintenance pool 40.

Each of the manager routines 22,32,42,52 may also be capable of determining a "health" measurement or status of the PSDs within their respective pools and reporting this measurement or status to the system manager 100. PSDs that have a particular health measurement or status may be allocated to the Maintenance pool 40. PSDs that are allocated to the Maintenance pool 40 are brought under the control of a maintenance manager 42 which operates to determine their failure modes and to attempt corrective action. For example, the maintenance manager 42 may run various diagnostics and tests to determine or verify any number of failure modes. For some failures, the maintenance manager 42 may attempt to reload the operating system and any application programs of the PSD 47. Other diagnostic and corrective actions may also be attempted.

Each of the manager routines 22, 32, 42, 52 and the system manager 100 may also include an Application Program Interface that may provide an interface to the particular manager routine for various tasks. For example, an indicia API 23 may provide interfaces to the indicia manager 22 and indicia queues 115, . . . 115$_n$, including functions for controlling the indicia queues 115, . . . 115$_n$, and creating indicia. A download API 33 may provide access to the functions performed by the download manager 32 including an interface for configuring postage downloading functions. A system manager API 103 may generally include interfaces for configuring or retrieving information about individuals or groups of PSDs, interfaces for controlling what events or parameters are written to log files, and may provide interfaces to client applications or other applications outside the system 10.

Figure 2:
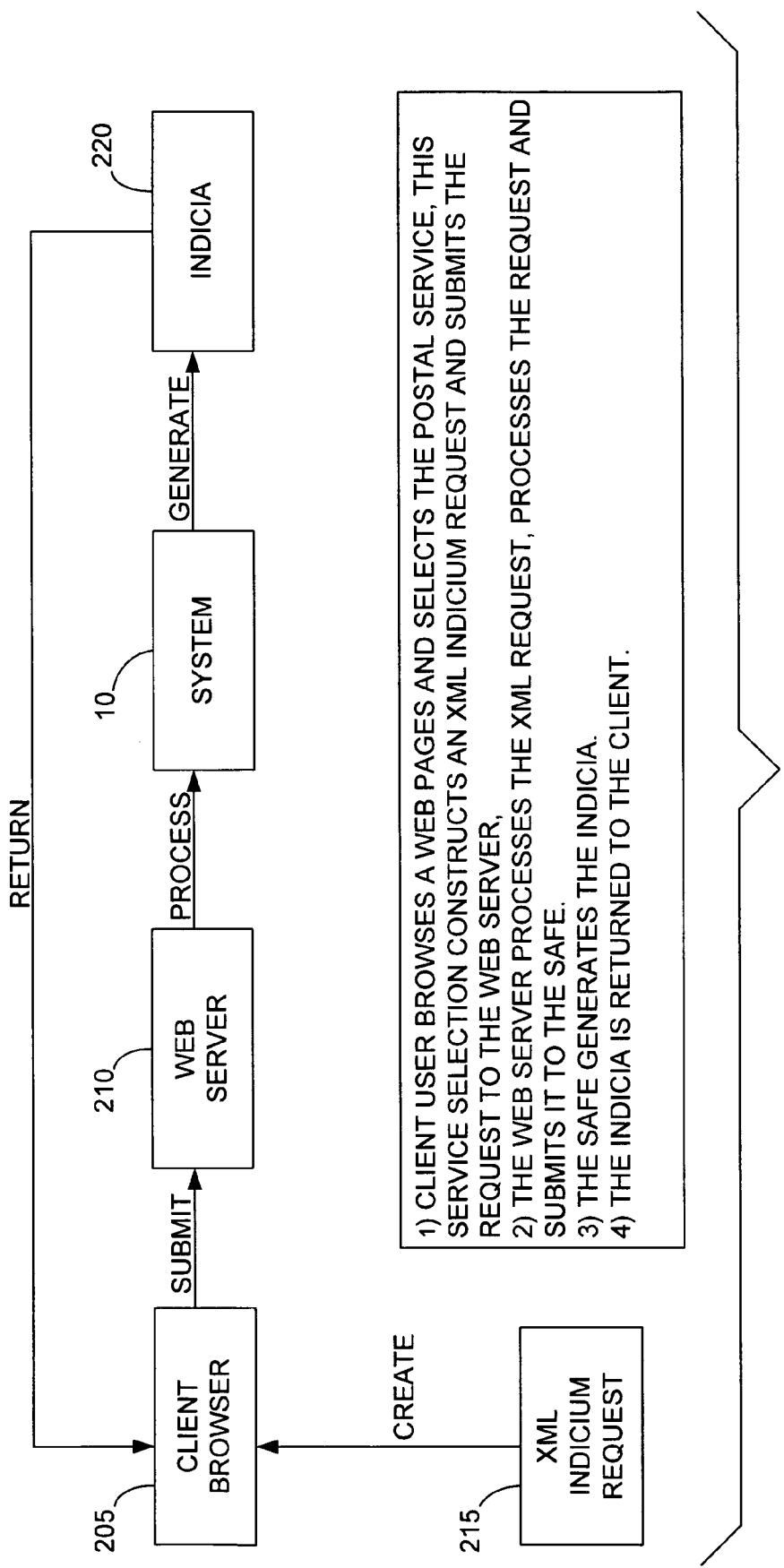
FIG. 2 shows an example where a web server operates as an interface between the system and a client browser.

Referring to FIG. 2, the present invention may include a user interface that includes a client browser 205 and a web server 210. Exemplary system operations might begin with a user browsing a web page using client browser 205 and creating an XML indicia request 215. The indicia request 215 may be submitted to web server 210 through client browser 205. Web server 210 may process the indicia request 215 and then submit it to system 10 through system manager API 103 (FIG. 1). The system manager 100 would then direct system 10 to produce the requested indicia 220 and deliver it to client browser 205 for use by the requesting user.

Figure 3:
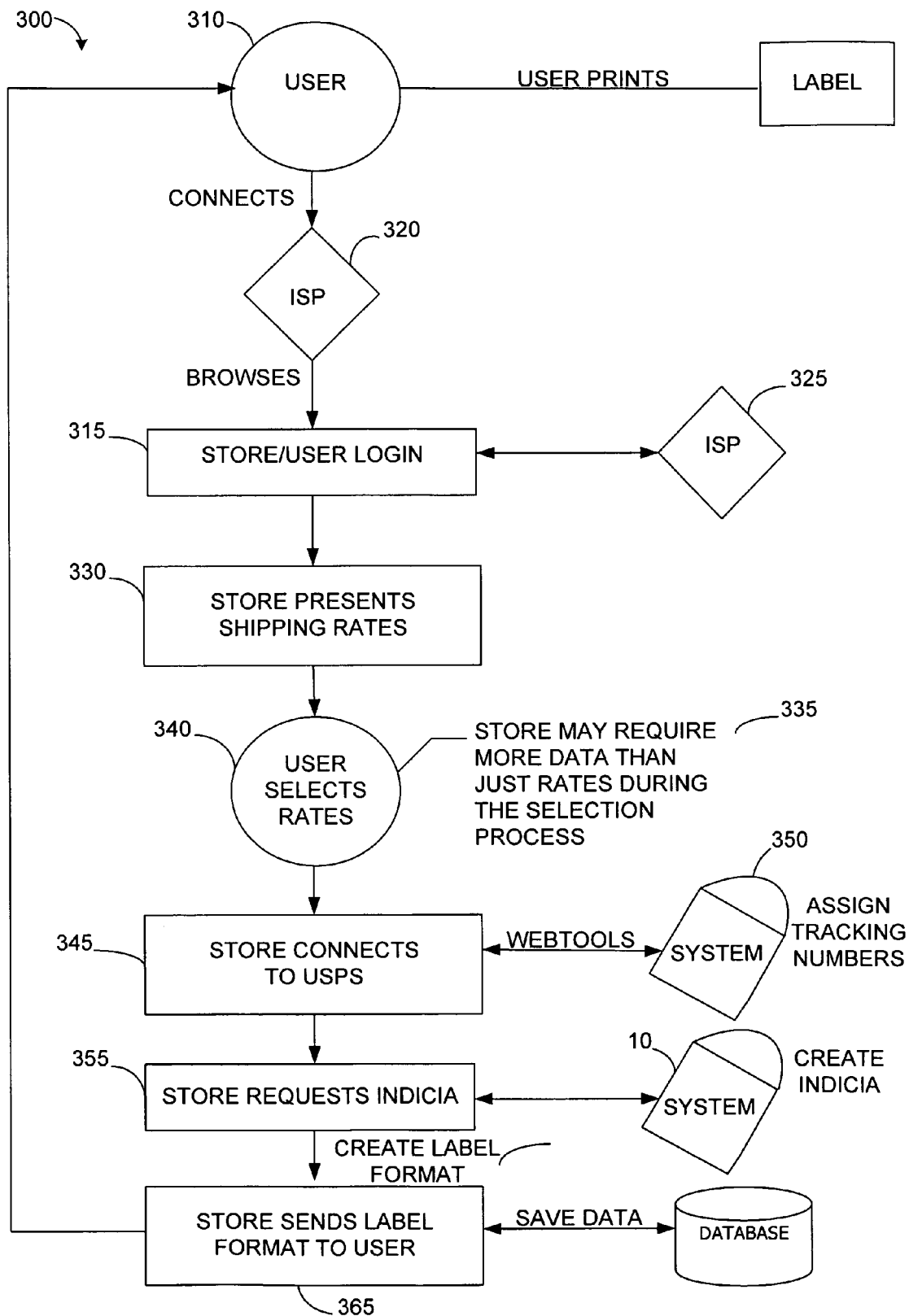
FIG. 3 shows an example of the disclosed embodiments implemented in a retailing system.

Referring to FIG. 3, the present invention may be incorporated in a retail system 300, for example, for shipping returned merchandise. A user may connect to the retail system 300, for example a web page 315, through an Internet Service Provider (ISP) 320 to request authorization to return merchandise. The retail system 300 may access a carrier's system to determine shipping rates and provide them to the user 330. A use may be prompted for more information 335 in the event that the retail system 300 requires additional information, and the user may then select a shipping rate 340. The retail system 300 may then connect to the carrier's system 345 and a tracking number may be assigned 350 for tracking the returned merchandise. The retail system 300 may then request indicia 355 from the system 10 through system manager API 103 (FIG. 1). Upon receiving the indicia, the retail system 300 formats a label 360, sends the label to the user 365, and stores data about the transaction 370.

Figure 4:
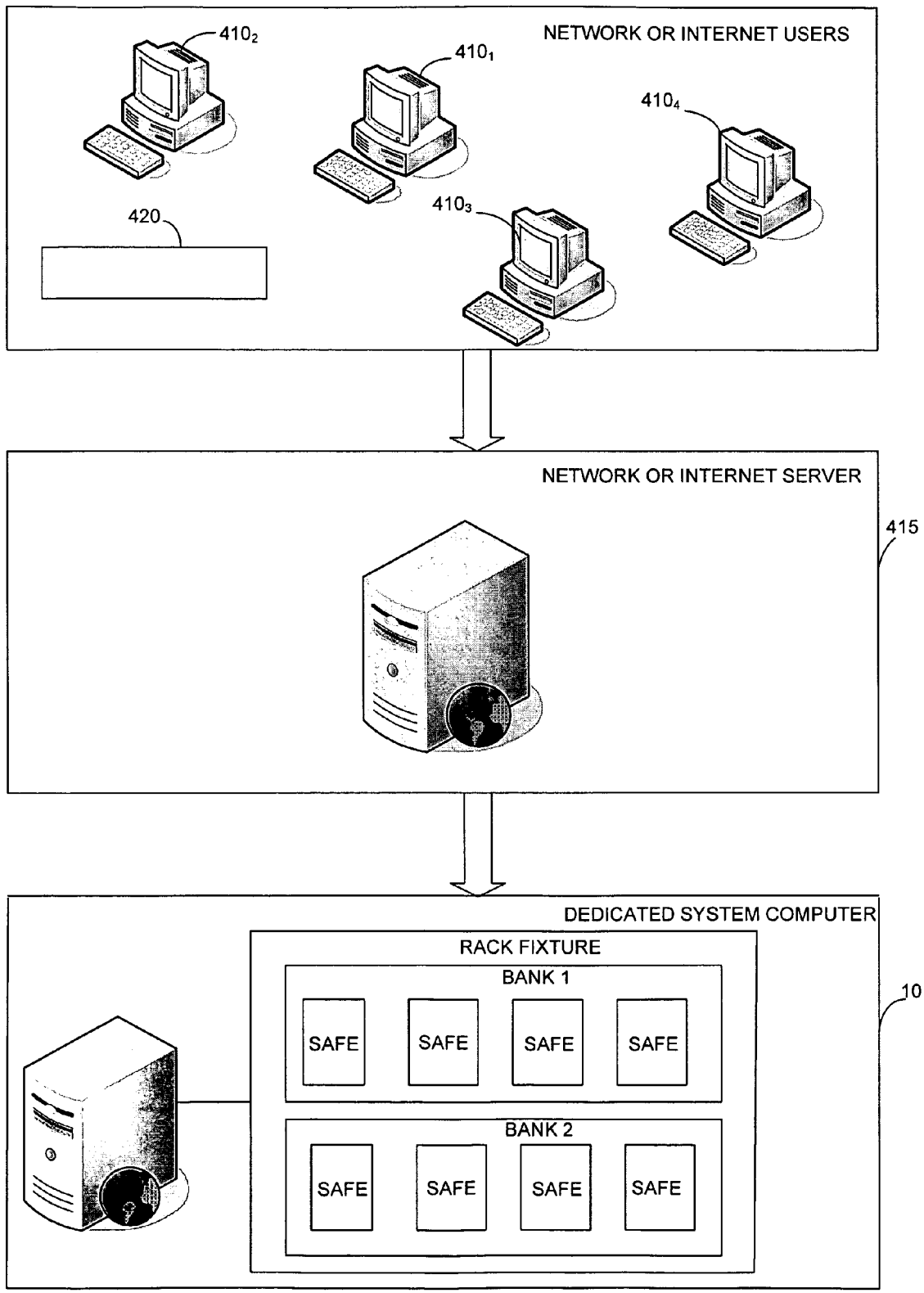
FIG. 4 shows an example of the disclosed embodiments implemented in an open system.

FIG. 4 shows an example of the disclosed embodiments implemented in an open system. An open system is defined as a system where a proof-of postage printing device is external to an indicia computational and generating device. As shown in FIG. 4, system 10 is connected to end users 410, ... $410_4$ through a server or other networking system 415. End users 410, ... $410_4$ are provided with a proof-of postage printing device 420 which is external to system 10. A user 410, ... $410_9$ requests indicia from system 10 and once generated, the indicia is delivered to user 410, ... $410_9$ through networking system 415. The requesting user may then print the indicia locally utilizing proof-of postage printing device 420.

Figure 5:
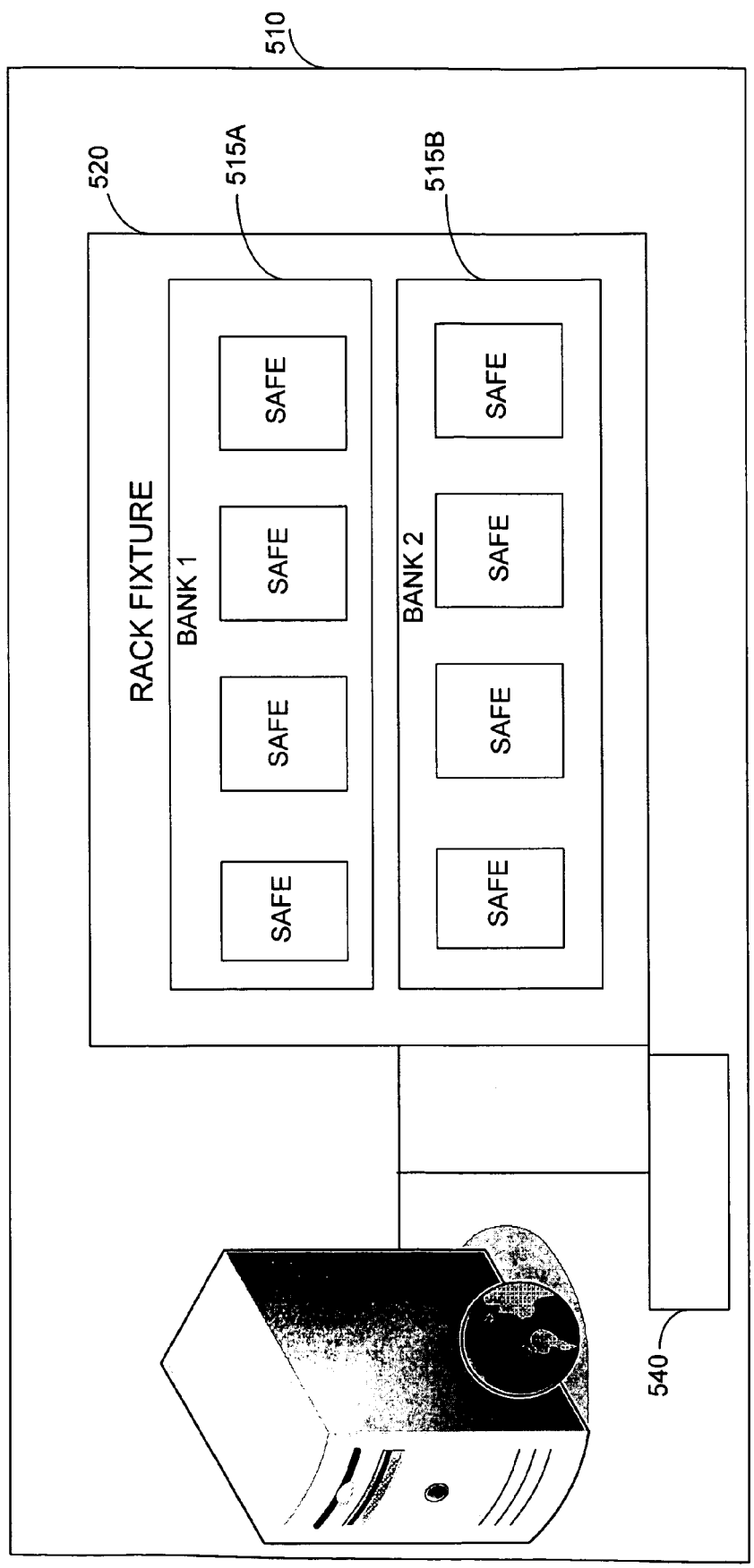
FIG. 5 shows an example of the disclosed embodiments implemented in a closed system.

FIG. 5 shows an example of the disclosed embodiments implemented in a closed system. A closed system is defined as a system where the proof-of postage printing means are housed within the system computational means or within a cryptographically secure boundary. For example, the closed system of FIG. 5 includes a cryptographically secure boundary 510. The PSD's of this system are located in banks 515A, 515B within a rack fixture 520. A proof-of postage printing device 540 resides within cryptographically secure boundary 510.

In any of the embodiments, pools 20, 30, 40, 50 may include PSDs that are distributed, that is, are connected by a network but are not necessarily in the same physical location.

Thus, the system 10 generally provides a mechanism where multiple PSDs may produce indicia at a high rate, and a robust software architecture that provides diagnostic and corrective action in the event of PSD hardware and software failure.

Figure 6:
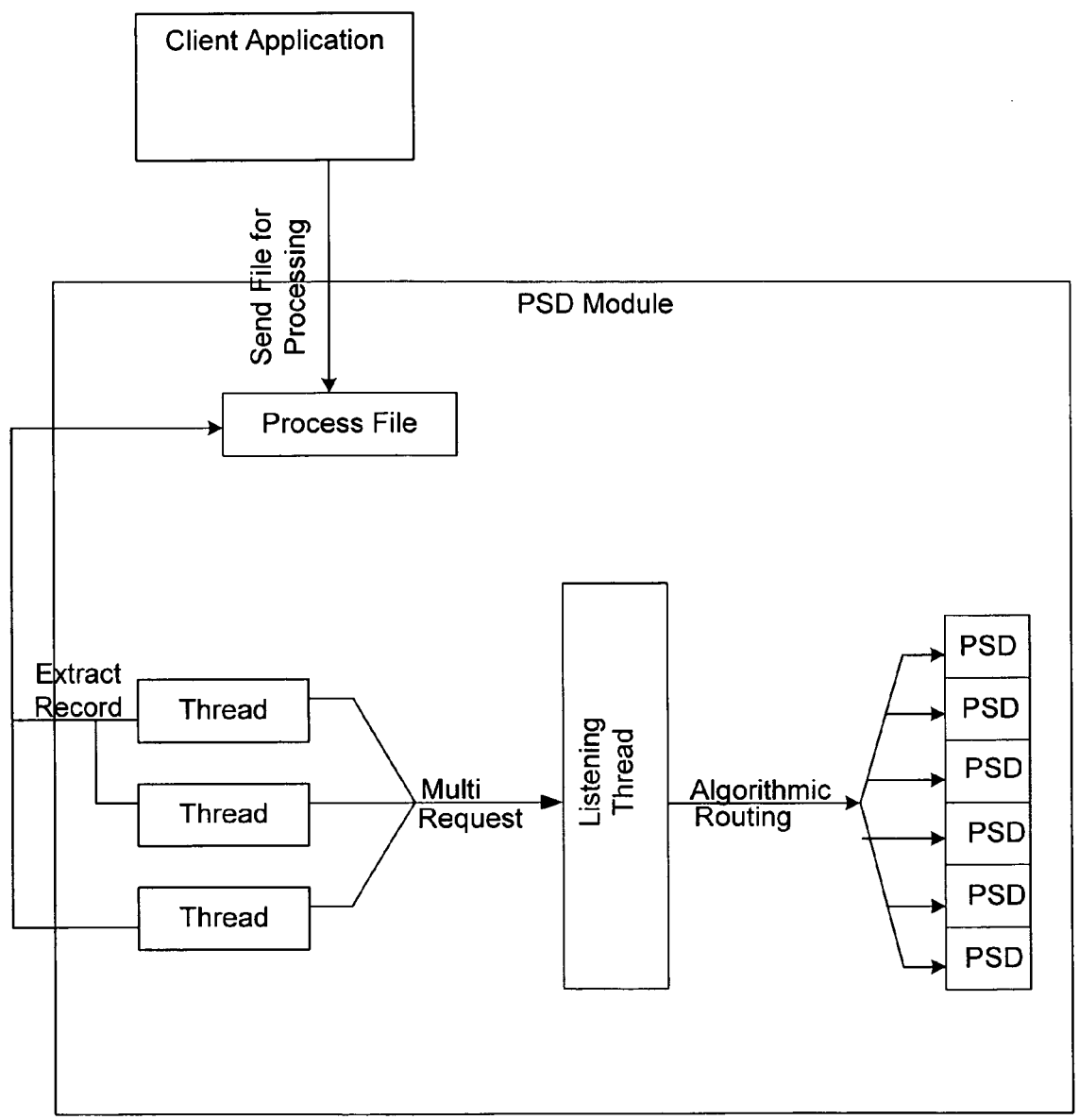
FIG. 6 shows an embodiment of a multi threaded calling application for maximizing indicia throughput.

FIG. 6 shows an enhancement to the present system for maximizing throughput of the indicia pool. The indicia pool, shown as a "PSD Module," includes a plurality of calling threads that operate to request indicia. The threads may added or deleted as required. Each thread is capable of requesting a particular number of indicia per hour, thus, adding threads results in an increase in the number of indicia that may be requested during a time period and deleting threads results in a corresponding decrease in the number of indicia that may be requested during a time period. Each thread may have an operating bandwidth, for example 19,200 indicia per hour.

The indicia requests may be received by a listening thread and routed to individual PSDs as required. A balancing algorithm may be used to decide which request is routed to which PSD.

In this embodiment, a client application may send a file for processing rather than an explicit request for indicia. In this example, the threads operate to extract records from the file and initiate corresponding requests for the indicia.

Figure 7:
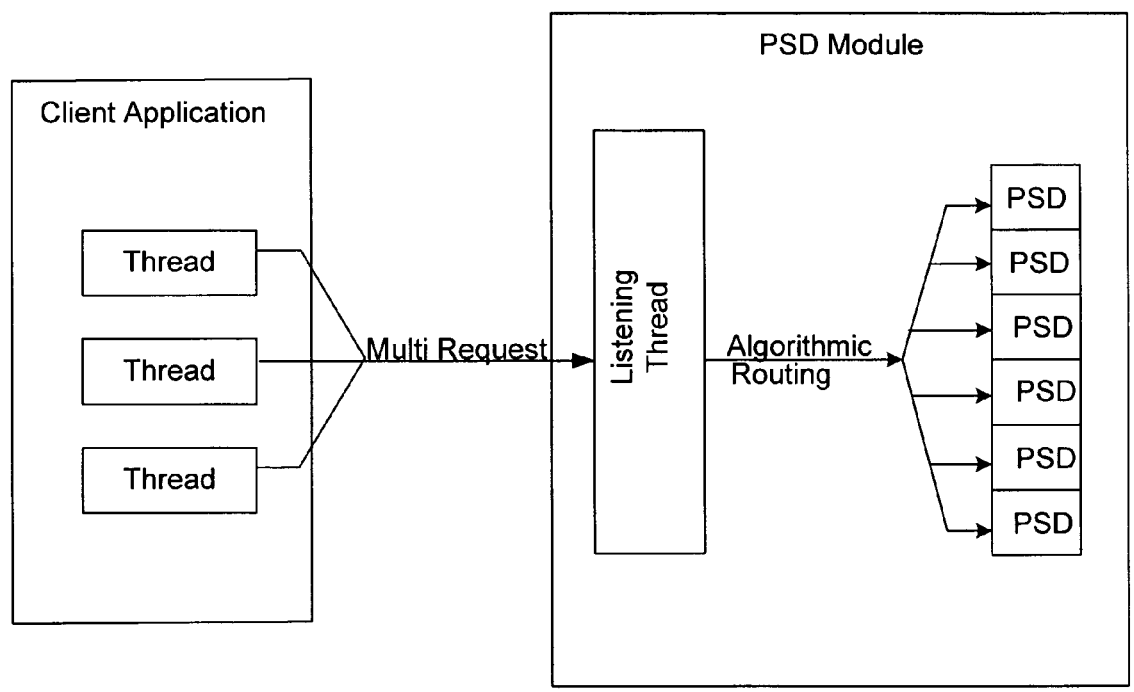
FIG. 7 shows another embodiment of a multi threaded calling application.

FIG. 7 shows an embodiment where the calling threads are located within a customer application.

Figure 8:
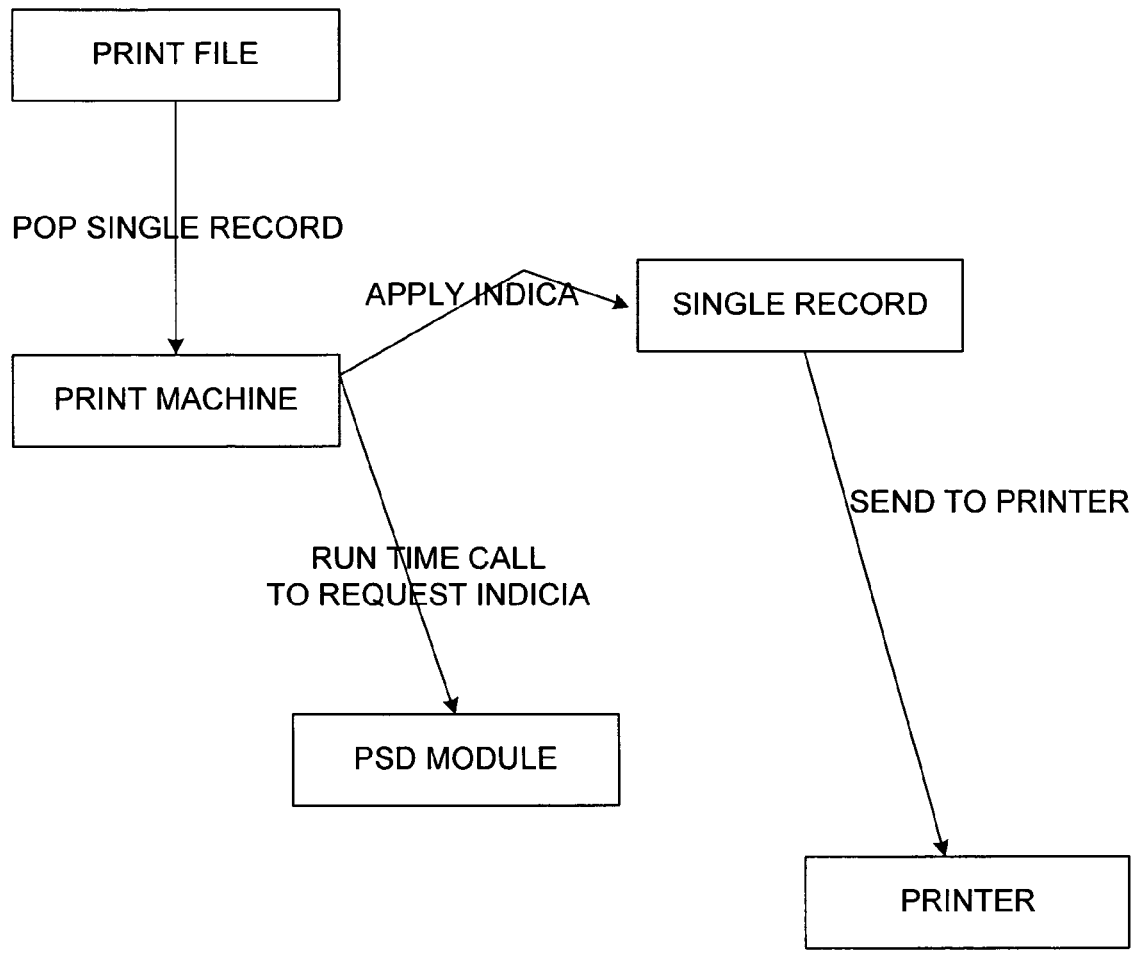
FIG. 8 shows a block diagram of a printing application utilizing the disclosed embodiments.

FIG. 8 shows a block diagram of a printing application utilizing the disclosed embodiments. In this embodiment a file for processing is created. A single record is popped from the file and sent to the system that dynamically allocates PSDs described herein, referred to as a print machine in FIG. 8. A run time call to request indicia is sent to the indicia pool, referred to as the PSD Module in FIG. 8. The PSD module returns the indicia as a single record which is sent to a printer and printed.

Figure 9:
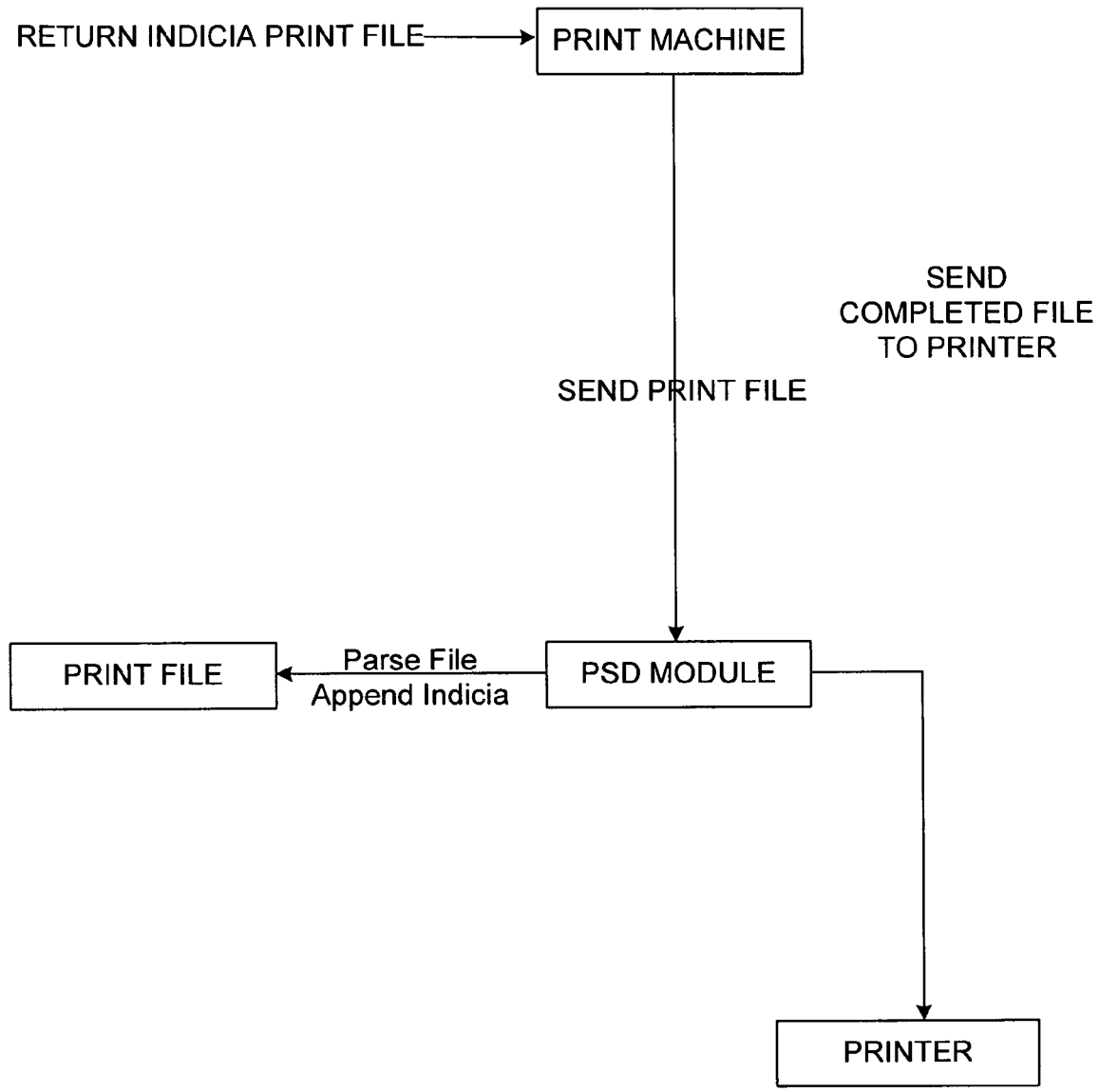
FIG. 9 shows a block diagram of another printing application utilizing the disclosed embodiments.
Figure 10:
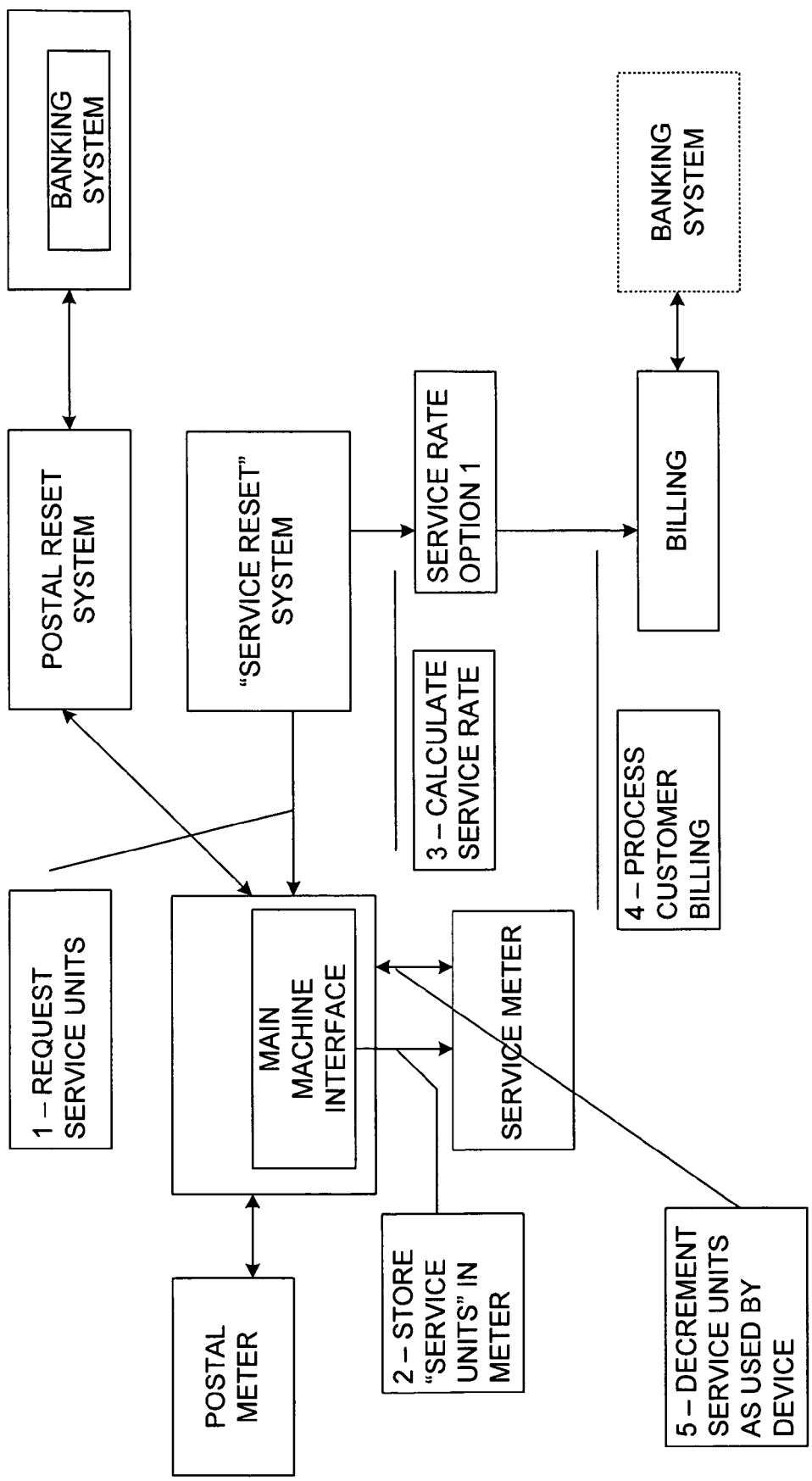
FIG. 10 shows another example of the disclosed embodiments.

FIG. 9 shows a block diagram of another printing application utilizing the disclosed embodiments. In this embodiment, the whole file is sent to the print machine and on to the PSD module. The PSD module parses the file and appends indicia to records in the file as required. The file with appended indicia, referred to as an Indicia Print File is returned to the print machine and then sent to a printer for printing.

A printing application that may utilize the embodiments of FIGS. 8 and 9 might include printing indicia directly on a mailing, such as a letter or invoice which is subsequently placed in an envelope or parcel. The indicia may be positioned so as to be visible through the envelope or parcel, for example, through a transparent window.

FIG. 6 shows another embodiment that includes billing functions. Some advantages of the disclosed embodiments include: Easy solution for any number of micro-payment (I,e: Payment of service per cycle), Possibility of a single bill for all services, Serve various business models (pre-payment, post-payment), Trusted by both parties because using similar technologies as a postal meter, Could manage various types of "service units": $, cycle to run with a given service, ink volume or ink cartridges, tapes to be used, feature upgrade, number of downloads (rates, software).

One franking device generally may use service units. The device may indicate to the service meter (the customer device that takes advantage of the indicia pools) which type of services are being used.

Other features may include: One postal meter (regulated)—secured interface with device and postal reset system; The customer device (trusted)—secured interface with device and service reset system; One postal reset system; One service reset system with a service rate table; The customer device may be remotely located and accessed on line as the device uses services (requires true on line connection); and The Service rate table is downloaded into the device and updated at each transaction (similar as a postal rate table). The service unit becomes "$" only.

In another embodiment, meter services may be remotely invoked from a base. Generally, the meter component may be separated from the base component. The base may communicate with a meter through TCP/IP and establishing a lightweight protocol to invoke services either synchronously or asynchronously. The advantages of separating the meter from its base include reducing the base into a printing mechanism making it as "thin" as possible allowing the meter to perform its meter functions separately from the base. The meter could be located within the enterprise network and may not always be hosted remotely. Instead the meter may be a part of a meter farm which an enterprise may host itself. The base may operate to discover a meter within a meter farm and may establish a one-to-one relationship between that meter. Out of the box the bases generally may have no identity and may arrive at a user site in a raw state. They may not be pre-configured. once a meter finds a meter farm, an administrator may allow that particular base to talk to a specific meter through assignment, for example, via a Mac-address of the base network card.

Meter farms may be constructed for a particular purpose, for example, a meter farm may provide postal services for bases, another could provide infrastructure services such as billing and accounting, another might provide credit services, etc.

The protocol between the base and the meter may be lightweight and fairly generic. One advantage would be that the base may be reduced in complexity, allowing for other non-traditional peripherals such as copiers to essentially print indicia.

An application may oversee PSD allocation among the various pools, and may handle requests and communication between customer devices, the various indicia pools, and the PSD's.

The PSD's may be operated or invoked from different types of clients, for example, browsers dedicated printers, etc.

Other services may be provided such as statistics management, remote configuration, and reporting.

A meter farm may be an array of PSD's that are allocated by an application service that will delegate requests from the bases to meters in the farm. The meter farm may be based in software, hardware or a combination of both.

A meter farm may be beneficial because the meters or PSD's may be clustered. Using an application to allocate meters in the meter farm allows other services for value to be provided. The features and licenses of a particular meter may be allocated and managed remotely, for example, if there are three licenses for a particular feature each one of those licenses can be delegated to a particular meter via a software application.

PSD or meter services may be balanced according to load ensuring optimum throughput. For example, units of each meter may be managed, consolidated, separated, allocated to different resources or departments, etc.

Scheduling of software downloads may be done remotely through an application. Real time statistics for the enterprise may be collected from the meters as opposed to uploading information from the bases. Statistics may be maintained on the meter itself therefore may be accessed in real time by an enterprise customer.

While particular embodiments have been described, various alternatives, modifications, variations, improvements, and substantial equivalents that are or may be presently unforeseen may arise to Applicant's or others skilled in the in the art. Accordingly, the appended claims as filed, and as they may be amended, are intended to embrace all such alternatives, modifications, variations, improvements and substantial equivalents.

What is claimed is:

1. A postal security device (PSD) allocation system comprising:
   a plurality of PSD pools, each of the pools associated with different PSD operations; and
   a PSD allocation device configured to assign by a computer processor each of a plurality of PSDs to one of the PSD pools based on at least one of: the status of the PSD and processing requirements of a computing system requesting PSD services,
   wherein, assigning the PSDs to one of the PSD pools comprises allocating at least one of the PSDs by the computer processor from a worker pool including a processing device configured to initialize the PSDs allocated to the worker pool, to an indicia pool of the plurality of PSD pools that is configured to perform separate functions from the worker pool including providing credit from PSDs allocated to the indicia pool usable for generating an indicia;
   wherein the allocating the at least one of the PSDs from the worker pool to the indicia pool is performed in response to an indicia queue for a required indicia, and is based on a current capacity of any PSDs already allocated to the indicia pool; and
   wherein the at least one of the PSDs is allocated to at least partially service the indicia queue.

2. The PSD allocation system of claim 1 wherein the plurality of PSD pools further include:
   a download pool including a processing device configured to download funds to the PSDs allocated to the download pool; and
   a maintenance pool including a processing device configured to perform maintenance operations on the PSDs allocated to the maintenance pool.

3. The PSD allocation system of claim 1 further comprising: a user interface configured to provide access to at least one of the PSDs in one of the PSD pools.

4. The PSD allocation system of claim 3 wherein the user interface is disposed remote to at least one of the PSD pools and accesses the at least one PSD across a network.

5. The PSD allocation system of claim 3 wherein the user interface is configured to submit a postage indicia request,
   and, in response to the postage indicia request, a PSD allocated to the indicia pool is operative to generate a postage indicia and provide the indicia to the user through the user interface.

6. The PSD allocation system of claim 5 further comprising:
   a plurality of calling threads configured to generate the postage indicia requests such that the number of calling threads may be adjusted as dictated by the computing system requesting PSD services, wherein each calling thread is controllable to request a predetermined number of indicia per hour.

7. The PSD allocation system of claim 3 wherein the system is configured to receive a request for service submitted by the user interface,
   and, in response to the service request, a PSD allocated to the worker pool is operatively assigned to account for the service requested and provide said service to the user through the user interface.

8. The PSD allocation system of claim 1 wherein the PSDs are distributed across at least one network.

9. The PSD allocation system of claim 8 wherein at least one of the PSDs is disposed on a meter pool.

10. The PSD allocation system of claim 1 wherein:
    at least one of the PSDs include service units usable by a service meter;
    the service meter is configured to assign and control micropayments for service features with the service units of the at least one PSD for a requested PSD service, the service features including at least one chargeable service provided by the at least one PSD distinct from a postage value of a postage indicia; and
    the at least one chargeable service includes at least one of an ink volume, ink cartridges, and tapes to be used.

11. The PSD allocation system of claim 1, wherein the PSD allocation device is further configured to assign a PSD from the indicia pool to another of the plurality of PSD pools based on a change in status of the PSD.

12. The PSD allocation system of claim 1, further comprising:

an indicia management device configured to automatically monitor the capacity of PSDs allocated to the indicia pool, to generate requests to the PSD allocation device to add at least one PSD to the indicia pool based on indicia requests and the capacity of PSDs allocated to the indicia pool, and to generate requests to the PSD allocation device to remove at least one PSD from the indicia pool based on indicia requests and the capacity of PSDs allocated to the indicia pool, wherein, the allocating the at least one of the PSDs from the worker pool to the indicia pool is performed in response the request from the indicia management device to add at least one PSD to the indicia pool, and the PSD allocation device is further configured to allocate a PSD from the indicia pool to the worker pool in response to the request from the indicia management device to remove at least one PSD from the indicia pool.

13. The PSD allocation system of claim 12, wherein the indicia management device is further configured to generate reports on a status of PSDs allocated to the indicia pool, and the PSD allocation device is further configured to allocate a PSD from the indicia pool to a maintenance pool including a processing device configured to perform maintenance operations on PSDs allocated to the maintenance pool based on the report.

14. A method for automatically managing a plurality of postage security devices (PSDs), the method comprising:

defining by a computer processor a plurality of PSD pools; and allocating by a computer processor each PSD of the plurality of PSDs to one of the plurality of PSD pools by a PSD allocation apparatus based on at least one of: the status of the PSD and processing requirements of a computing system requesting PSD services, wherein, allocating the PSDs to one of the plurality of PSD pools comprises automatically allocating by a computer processor at least one of the PSDs from a worker pool including a processing device for initializing the PSDs allocated to the worker pool, to an indicia pool of the plurality of PSD pools that is configured to perform separate functions from the worker pool including providing credit from PSDs allocated to the indicia pool usable for generating an indicia;

wherein the allocating the at least one of the PSDs from the worker pool to the indicia pool is performed in response to an indicia queue for a required indicia, and is based on a current capacity of any PSDs already allocated to the indicia pool; and wherein the at least one of the PSDs is allocated to at least partially service the indicia queue.

15. The method of claim 14 wherein the PSD pools include:

a download pool including a processing device configured to download funds to the PSDs allocated to the download pool; and a maintenance pool including a processing device for performing maintenance operations on the PSDs allocated to the maintenance pool.

16. The method of claim 14 further comprising:

accessing at least one of the PSDs in one of the PSD pools through a user interface.

17. The method of claim 16 wherein the user interface is disposed remote to at least one of the PSD pools and accesses the at least one PSD across a network.

18. The method of claim 17 further comprising:

receiving, via the user interface, a postage indicia request, such that a PSD allocated to the indicia pool is operative to generate a postage indicia and provide the indicia to a user through the user interface.

19. The method of claim 18 whereby the indicia is in the form of at least one of a print image or a data construct converted to a print image by an indicia requesting entity.

20. The method of claim 18 wherein the user interface is a browser application.

21. The method of claim 18 wherein the indicia requests are received from a plurality of calling threads, whereby the number of calling threads may be adjusted as dictated by the computing system requesting PSD services, wherein each calling thread is controllable to request a preset number of indicia per hour.

22. The method of claim 14 wherein at least one of the PSDs include service units usable by a service meter, the method further comprising;

assigning and controlling micro-payments by a computer processor for service features with the service units of the at least one of the PSDs for a requested PSD service, the service features including at least one chargeable service provided by the at least one of the PSDs distinct from a postage value of a postage indicia; and the at least one chargeable service includes at least one of an ink volume, ink cartridges, and tapes to be used.

23. The method of claim 14, further comprising assigning a PSD from the indicia pool to another of the plurality of PSD pools based on a change in status of the PSD.

* * * * *